Aug. 29, 1939.  M. LODEWICK ET AL  2,170,971
EDUCATIONAL DEVICE
Filed Dec. 2, 1936
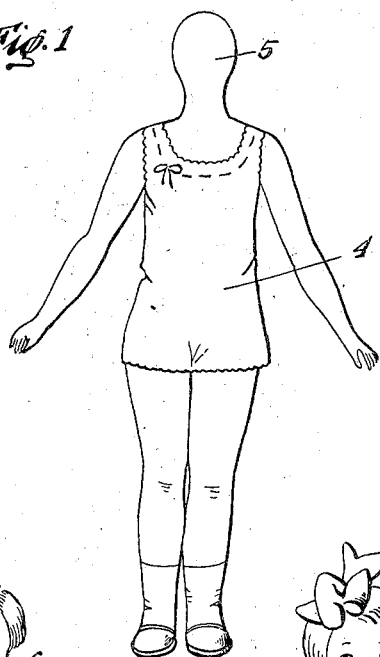
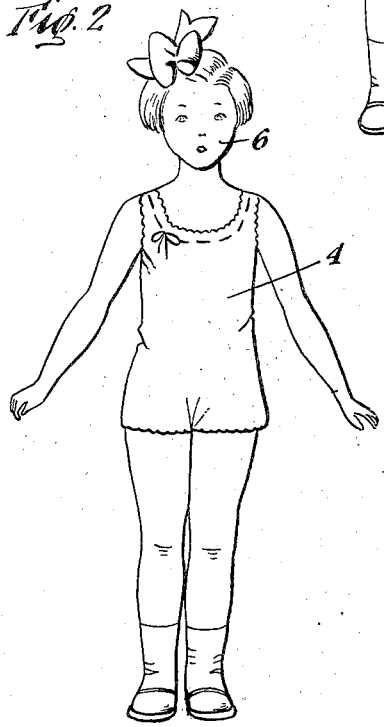
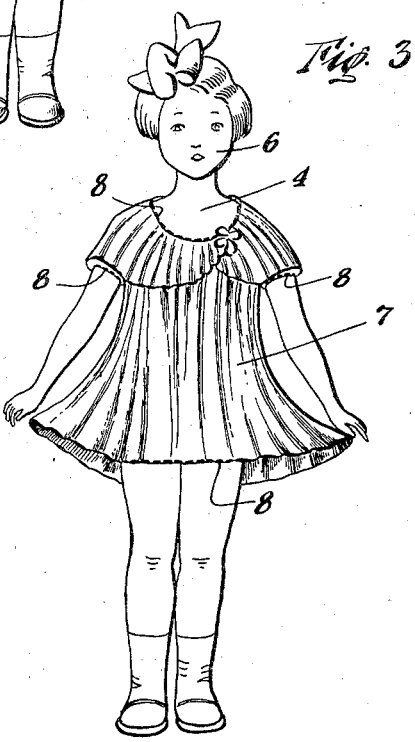
INVENTORS
Mildred Lodewick
BY Madeleine Lodewick
ATTORNEYS.

UNITED STATES PATENT OFFICE 2,170,971

EDUCATIONAL DEVICE

Madeleine Lodewick and Mildred Lodewick, New York, N. Y.

Application December 2, 1936, Serial No. 113,750

2 Claims. (Cl. 35—23)

Our invention relates to an improvement in educational dolls.

An important object of the invention is to provide an educational doll capable of having affixed to it as its head a photograph of the head of the child possessor and capable of having superimposed upon it cut-outs simulating costumes in order to instill in the child an interest and pride in the composition, selection and care of the child's clothes.

A further object of the invention is to provide a manikin capable of having superimposed upon it cut-outs simulating costumes, and having as its head a photograph of the head of the possessor, to impart to the manikin the personality of the possessor.

A further object of the invention is to provide a personalized manikin for use by merchants as an advertising medium.

Other objects and advantages of the invention will be apparent during the course of the following description.

In the accompanying drawing, forming a part of this specification, and in which like numerals are employed to designate like parts throughout the same;

Figure 1 is a front elevation of a basic figure of a doll embodying our invention, Figure 2 is the basic figure of a doll embodying our invention with a photograph, lithograph or other suitable representation of the head of a child simulated thereon as the head of the doll, and Figure 3 is the basic figure of a doll embodying our invention with the representation of the head of a child simulated thereon as the head of the doll and with the figure dressed with a cut-out simulating a costume.

In the drawing, wherein for the purpose of illustration is shown an embodiment of our invention, the numeral 4 designates the body of the basic figure of a doll. This body 4 is two dimensional and is composed of paper, cardboard, or any suitable material. In this embodiment the proportions of the body 4 are those of a normal child aged seven. Upon this body 4 in the preferred embodiment as illustrated are drawing and coloring matter simulating flesh, underclothing, shoes and stockings.

From the neck of the body 4 extends the tab 5. This tab 5 is an oval continuation of the line of the neck of the body 4 and bears approximately the same dimensional relation to the body 4 as does the normal human head to the normal human body.

The numeral 6 designates a photograph, lithograph or other suitable representation of the head of a child which has been affixed by paste or other suitable means to the tab 5. The representation 6 may be formed directly on the tab 5 by any suitable method such as photographic contact printing.

The numeral 7 designates a cut-out simulating a child's costume which has been superimposed on the body 4 by inserting the arms and legs of the body 4 through the slots 8 in the cut-out 7, or by any other suitable means.

The manner in which this embodiment of our invention is to be utilized is as follows:

To the tab 5 extending up from the body 4 of the doll is affixed a photograph 6 of the head of a child. The doll is then in readiness to have superimposed upon it any suitable cut-out 7 simulating a costume.

It will be seen that a child owning a doll embodying our invention will be stimulated by the photographic likeness of the doll to itself, to the effect that when the doll is dressed with cut-outs simulating costumes the child will be impelled to take a keener interest in its own clothes, and in its desire to imitate with its own clothes the costume of the doll will have instilled in it an early appreciation of good taste and an instinct toward neatness.

It is to be understood that the embodiment of our invention herewith shown and above described is to be taken only as an example of the same, and that the invention is capable of minor variations which will readily occur to those skilled in the art. For example, the body 4 might represent one of any suitable age, and further it is obvious that the representation 6 which is the head need not necessarily be that of the head of a child.

Having thus described our invention, we claim:

1. An educational device, comprising a substantially two-dimensional figure formed of sheet material simulating the body of a child, a tab projecting from the portion of the figure corresponding to the head and neck, and a portrait of the child who is to possess the figure attached to the tab.

2. The method of making a doll, adapted to educate children in the selection, care and composition of their clothing, which comprises forming from sheet material a figure simulating the body of a child having a tab projecting from the shoulders in the place of a head, separately making a portrait of the head of the child who is to possess the doll, and attaching the portrait of the child's head to the tab, whereby a completed doll is formed, to which may be applied costumes.

MADELEINE LODEWICK.
MILDRED LODEWICK.